Feb. 24, 1970   D. P. DUFF ET AL   3,496,630
METHOD AND MEANS FOR JOINING PARTS
Filed April 25, 1966
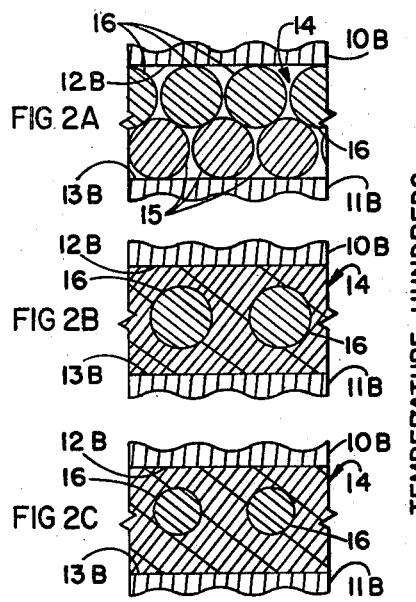
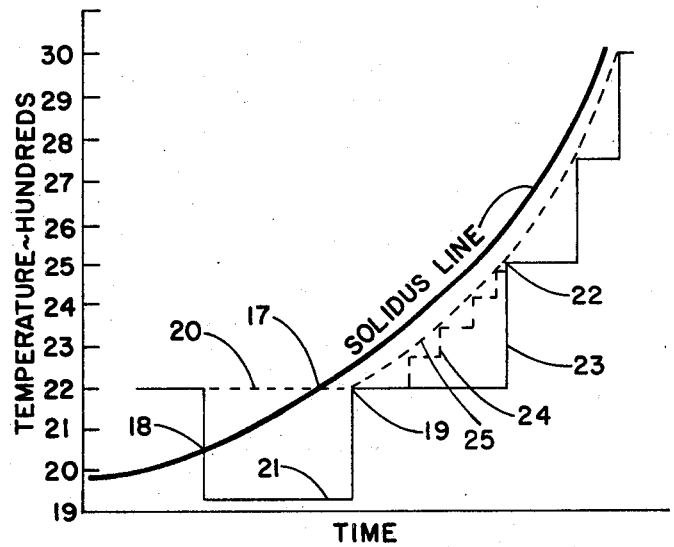
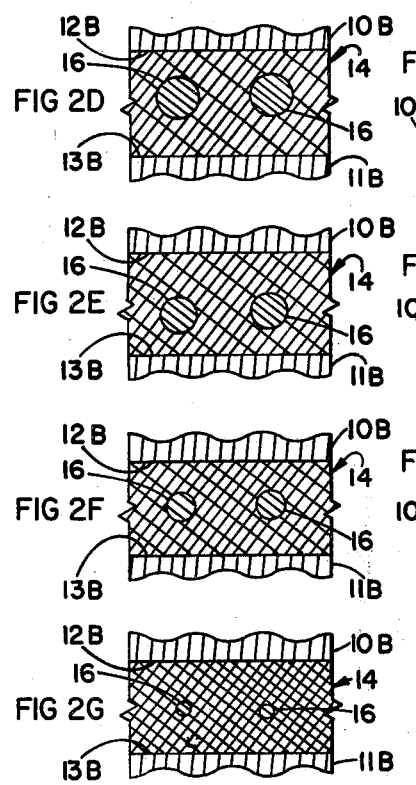
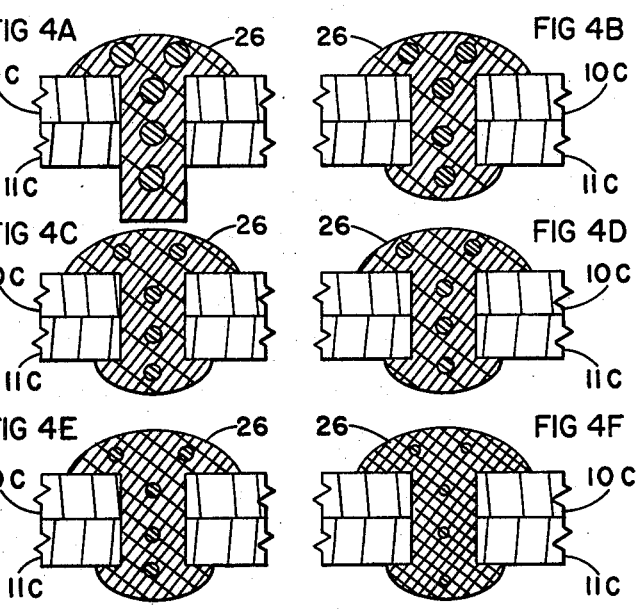
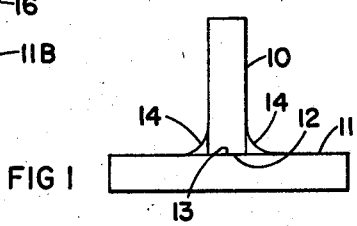
DAN P. DUFF
JOSEPH A. VAN VELZOR
INVENTORS
BY H.C. Goldwire
AGENT United States Patent Office 3,496,630
Patented Feb. 24, 1970

3,496,630
METHOD AND MEANS FOR JOINING PARTS
Dan P. Duff, Grand Prairie, Tex., and Joseph A. Van Velzor, Columbus, Ohio; said Duff assignor to LTV Aerospace Corporation, Dallas, Tex., a corporation of Delaware
Filed Apr. 25, 1966, Ser. No. 551,824
Int. Cl. B23k 31/02
U.S. Cl. 29—487                                   14 Claims

ABSTRACT OF THE DISCLOSURE

A method of joining parts wherein a mixture of two types of metallic particles are heated to melt only one of said types of particles then connecting the parts with said mixture and raising the melting temperature of the fused material by effecting solid state diffusion so as to produce an alloy of the two types of metallic particles.

---

This invention relates to methods and means for joining parts, and particularly to methods employing and means comprising metallic alloys which are resistant to high temperatures.

It has become increasingly important, especially in high speed aircraft applications, to use materials for structural applications that are capable of withstanding extremely high temperatures and corrosive attacks normally associated therewith. Stainless steels and the so-called super alloys have been employed, of course, where possible to meet the requirements of high strength-to-weight ratios, corrosion resistance, etc., at elevated temperatures. Where such materials have not been able to satisfy design requirements, designers have frequently turned to refractory metals and alloys (such as columbium and columbium alloys) as well as ceramic or carbonaceous materials. The greatest impediment to efficient use of these materials, however, has been the difficulty of obtaining satisfactory joints between parts made of such materials.

While brazing has been a popular method for joining materials, it has not been without its disadvantages. Since brazing comprises joining two or more parts with a brazing material in a molten state, the service or design temperatures for such joined parts previously have always been less than the brazing temperature; for the parts, once rigidly joined, could never be safely used where their service temperature might rise to their former brazing temperature. A return to the brazing temperature would almost inevitably result in remelting the brazing material and consequent collapse of the joint. As to exceptions to this general rule, it has been speculatively stated that the isolated cases of a remelt temperature reportedly being somewhat higher than the brazing temperature have been caused by complete diffusion of the brazing material into the parts being joined such that the brazing material, as such, no longer existed exteriorly of the parts to be remelted. Thus, to be certain that the brazing material will not remelt and that the parts will not separate, service temperatures have been prudently held at less than the brazing temperatures.

While there has been some effort toward developing brazing alloys for service in the 2000° to 2500° F. range, the well-known and dependable brazing alloys and processes have generally been confined to a temperature range of 800° to 2000° F. the minimum brazing temperatures, i.e., the lowest temperatures at which the brazing materials become molten, have only been set as high as necessary to ensure complete melting, and materials having melting temperatures of about 800° F. have generally produced satisfactory joints for service up to 500° F. As the desire to increase service temperatures from, say, 500° F. to 1000° F. occurred, brazing materials having higher melting points were of necessity selected, e.g., those having melting points up to about 1500° F. Such increases in brazing temperatures, while previously necessary, were not without deleterious consequences; for fixtures or jigs are usually employed to hold the parts in the proper spatial relationship while the brazing material is molten. These fixtures and the like must themselves possess appreciable strength at the brazing temperature, i.e., they must have a melting temperature at least higher than the brazing temperature and therefore appreciably higher than the expected service temperature. It has been the practice that when it was desired to raise the service temperature, both the brazing temperature and the melting temperature of the fixtures have been increased more or less proportionately. Thus it may be seen that three related temperatures in a given brazing process of the prior art may be characterized as having a stair-stepped relationship, with the service temperature being a desired value, the brazing temperature being a first step of a certain amount higher than the service temperature, and the melting temperature of the brazing fixtures being a second step higher than the service temperature by an additional amount. By projecting this stair-stepped temperature relationship of prior-art processes to a higher level, it should be apparent that eventually a practical limit on such brazing processes will be reached, even if the required financial investment in equipment is not a major obstacle. For example, if a service temperature of 3000° F. is desired, a brazing temperature of about 3300° F. could be expected and the melting temperature of the brazing fixtures should probably be no less than about 3700° F. The magnitude of these temperature values should cause apprehension concerning the economics, if not the feasibility, of such an imaginary brazing process. It may thus be understood why brazing is normally considered to be a routine joining process only for parts having service temperatures of 2000° F. or lower.

The equipment that is normally commercially available for brazing further contributes to keeping brazing temperatures below 2200° F. and therefore keeps the resulting service temperatures even lower. That is, vacuum or controlled-atmosphere furnaces for elevated temperatures usually fit into two classes. The first class comprises those commonly referred to as low-vacuum furnaces, which have a practical maximum temperature of about 2200° F. or, occasionally, 2300° F. The second class comprises those commonly called high-vacuum furnaces which, besides being much more expensive, are usually smaller and somewhat more complex to use than are the low-vacuum furnaces. Since a large percentage of the volume of any furnace must usually be wasted in accommodating fixtures or jigs, use of high-vacuum furnaces in particular may be difficult to justify on economic grounds. Not only is the space taken up by a fixture denied to a production part, but also the energy consumed in heating the fixture is wasted. In spite of this obvious wastefulness, no alternative—except tack welding—to the use of fixtures and the like during entire brazing operations has been suggested in the prior art.

Tack welding, as a means of holding parts together while the brazing material is molten, is not a panacea as compared to the use of fixtures, jigs, etc., for it too may impose certain liabilities. Perhaps most pronounced of these liabilities is the rather infamous tendency of most common welding materials to contaminate or attack and to cause strain in the materials being joined during the brazing process, with the result that the weld zone in the parts frequently becomes excessively brittle and weak. The refractory metals and alloys are especially sensitive to such contamination, and the resulting brittleness of the parts is a particularly bothersome characteristic. Accordingly, tack welding is normally employed only in areas that can be trimmed away after brazing, the welded area being discarded as scrap. The labor involved in initially making the tack welds (as well as the labor involved in cutting the weldments away) when coupled with the waste of material, makes tack welding an expensive approach to accomplishing the desired function of holding parts together until they are securely bonded.

Another consideration that has tended to hold brazing temperatures in the vicinity of or below 2000° F. is the low oxidation resistance of commonly used structural materials, such as alloys of nickel and iron, as well as refractory materials such as tungsten, tantalum and columbium. Too, contamination of refractory materials by hydrogen and nitrogen as well as oxygen at elevated temperatures can be a problem if proper precautions are not taken. Accordingly, refractory materials are normally heated, to a temperature sufficient to braze, only in a protective atmosphere, e.g., in an inert gas or vacuum. To alleviate (if not eliminate) problems of oxidation and contamination, considerable effort has been devoted to the development of protective coatings for metallic parts (especially columbium), which coatings can often make the difference between probable success and certain disaster at elevated temperatures. While it is usually recommended that parts should be joined first and then protectively coated before being exposed to temperatures of say, 2500° or 3000° F., it is the possibility of extending the joining (i.e., brazing) temperatures to 2500° or 3000° F. that necessitates exposure of the parts to the high temperatures where protective coatings are recommended. That is, it is desirable that the parts be clean and bare so that the molten brazing material will readily wet the surfaces to be joined and, upon solidification, the brazed joint will be sound; but the same clean and bare surfaces that are easily bonded are also easily attacked by oxidation, etc. Conversely, protecting the part surfaces against oxidation by, for example, flame-spraying the surfaces with zirconia, introduces a potential obstacle to realization of a sound brazed joint. Usually the admonition to join first and coat second has been heeded, such that joining temperatures have either been kept appreciably below 2200° F. or else meticulously (and expensive) care has been employed to maintain a safe environment for the parts until they have been joined and their temperature subsequently lowered. The apparent incompatibility of unusually high service temperatures and an economical as well as a relatively protected method of achieving the same has been so evident that there is a dearth of even speculation as to a solution, except perhaps an occasional proposal to attempt to braze through protective coatings placed on the parts before brazing. Thus, nowhere in the prior art has the suggestion appeared that there might be a process for achieving a joint having, say, a 3000° F. service temperature, which process includes the possibility of having the parts—and joint—completely protected with a corrosion-resistant coating during any part of the process at elevated temperatures.

While the utility of a brazing material which can produce joints having a remelt temperature above 2500° or even 3000° F. should be obvious, those concerned with materials for elevated-temperature service will probably realize that other joining media could similarly benefit from having higher melting temperatures. Since the strength of a metallic material usually drops off rather drastically as the melting temperature is closely approached, materials for mechanical fasteners and connectors such as rivets, bolts, etc., must frequently be selected on the basis of a compromise between ease of fabrication of the material and a high melting temperature (the high melting temperature usually contributing to a favorable strength-to-weight ratio at elevated temperatures). While it is known to fabricate parts of a given material in a relatively "soft" condition and then heat treat them to change their structure and to thereby increase their resistance to deformation, such heat treatment does not materially affect the melting temperature of the material. Consequently, heat treatment alone has not been the solution to providing workability such that mechanical connectors can be formed at, for instance, room temperature, while also providing serviceability at, for example, 2500° F.

It may thus be seen that it is highly desirable to provide a mechanical fastener whose melting temperature can be raised after the fastener is fabricated, just as it is desirable to raise the remelt temperature of a brazed joint or any other connecting means.

Accordingly, it is a major object of this invention to provide a novel brazing process, at least part of which process is carried out at temperatures substantially above conventional brazing temperatures.

Another object is to provide a novel brazing method in which the expected service temperature of the brazed parts can safely be higher than the highest temperature reached in the brazing process.

A further object is to eliminate the need for tack welding, fixtures, or jigs to maintain a proper spatial relationship between parts during at least a portion of the brazing process at elevated temperatures.

Yet another object is to provide a brazing composition which will produce a serviceable joint for parts at elevated temperatures both above and below 2500° F.

A still further object is to provide a brazing mixture which is well suited for the brazing of refractory metals and alloys, and in particular is well suited for brazing columbium and its alloys.

Still another object is to provide a novel material from which mechanical fasteners for elevated-temperature service can be readily fabricated.

An additional object is to provide an intermediate material for mechanical fasteners which is compatible with conventional forming techniques and also provides unusual serviceability at elevated temperatures.

Another object is to provide an improved and economical method of brazing in high vacuum furnaces.

Other objects and advantages will be obvious from the specification and claims and from the accompanying drawing illustrative of the invention.

In the drawing:

FIGURE 1 is a diagrammatic representation of two adjacent parts, together with brazing material for joining the same;

FIGURES 2A through 2G constitute a series of diagrammatic, sectional views illustrative of changes, in the brazing material, at successive moments during joining of the parts of FIG. 1, in which views are shown portions of the surfaces to be joined, together with material of the invention interposed between the surfaces;

FIGURE 3 is a time-temperature plot of the joining method of the invention; and

FIGURES 4A through 4F constitute a series of longitudinal, sectional views, diagrammatic in nature, of a mechanical fastener processed in accordance with the invention.

With initial reference to FIGURE 1, first and second parts 10, 11 are representative of any two parts which are to be joined, the parts having two mutually contiguous (but not necessarily contacting) surfaces 12, 13. Placed adjacent the surfaces 12, 13 is a mixture 14 comprising particles of at least two metallic materials, the mixture being intended to serve, in this case, as a brazing mixture for joining the parts.

With further reference to FIGURE 2A, portions of two parts 10B, 11B are shown having respective surfaces 12B, 13B adjacent one another with some of the mixture 14 interposed therebetween. In this figure, the gap between the surface 12B, 13B has been magnified and the particles in the mixture 14 exaggerated such that the interaction of the mixture's constituents may be more clearly understood. The mixture 14 comprises first metallic particles 15 intermixed with second metallic particles 16 and held together by virtue of the friction between the particles or, if desired, by the use of a binder or a liquid carrier. It will be understood that it is not convenient to represent such a binder in the drawing, but that a suitable binder such as an aqueous solution of methyl cellulose could be readily employed, as desired, by one practicing the invention. Also, it should be understood that the symmetrical shape and relative size of the particles 15, 16 is not meant to be limiting, but rather is employed, in the drawing, only for convenience and clarity of representation.

The first particles 15 may be particles of a single metal, for example, silver, gold or copper; or they may be particles of an alloy such as, for example, titanium-iron. Particles of titanium-iron can conveniently be made by arc melting intermixed titanium and iron powders, and then grinding or otherwise reducing the resultant arc-melted nugget to small particles. Selection of the metal or metals for first particles 15 is based primarily on their melting points, it being required that the melting point of the first particles be lower than the melting point of the parts 10, 11 to be joined. The metallic particles 15 optimally comprise approximately 20 to 65 mole percent of mixture 14, excluding the presence of any binder or non-metallic carrier vehicle, and are selected so that they readily wet the surfaces 12B, 13B when molten.

The second metallic particles 16, which are uniformly intermixed with the first particles 15, are normally particles of one or more relatively pure metals rather than particles of one or more alloys, although there is no reason to exclude alloys if they meet the tests hereinafter described. The second particles 16 which, by mole percentage, usually comprise the balance of the metallic constituents of the mixture, are selected on the basis of having a melting temperature higher than that of the first particles 15 and being compatible with said first particles such that they will diffuse into the first particles to form an alloy having a melting temperature higher than that of the first particles. Because of the relationship of the melting temperatures of the particles 15, 16, it perhaps will be more functionally descriptive as well as convenient herein to refer to first particles 15 as low-melting particles and the second particles 16 as high-melting particles. Examples of such high-melting particles 16 and their respective melting points or temperatures are columbium, 4380° F.; nickel, 2651° F., palladium, 2829° F.; platinum, 3223° F.; tantalum, 5425° F.; and tungsten, 6080° F. Generally accepted melting temperatures of the aforesaid low-melting point metals are copper, 1981° F.; gold, 1945° F.; and silver, 1761° F. The melting temperature of titanium-iron alloy is of course dependent on the composition of the alloy, and a phase diagram should be employed to select an optimum, low-melting composition. Defense Metals Information Center Report 136A entitled, The Effects of Alloying Elements in Titanium, vol. A, Constitution, published by Battelle Memorial Institute contains, at page 65, such a phase diagram which indicates that an advantageous eutectic point exists at 1085° C. or 1985° F. for Ti-Fe having a composition by weight of 68% titanium and 32% iron.

Not all the exemplary high-melting particles 16 are known to meet the criterion of being diffusible into all of the aforementioned low-melting particles 15, but it is known that certain high-melting particles can be paired with certain low-melting particles to achieve the desired results with certainty. Thus, of the mentioned metals, if the low-melting particles comprise at least one metal selected from the group consisting of copper, gold, and silver, the high-melting particles 16 can be particles of palladium. If the low-melting particles 15 comprise at least one metal selected from the smaller group consisting of only gold and copper, the high-melting particles 16 can be particles of one or more metals selected from the group consisting of nickel, palladium and platinum. If the low-melting particles 15 are of titanium-iron, the high-melting particles 16 can be one or more metals selected from the group consisting of columbium, tantalum, and tungsten.

While the three above-stated combinations of metals is not meant to exclude others, these three are of great usefulness if the expected service temperature is high, e.g., about 2000° F. or above. Their unusual serviceability at elevated temperatures does not, of course, preclude equally satisfactory service at room temperature or any other temperature. The third combination, the low-melting particles 15 of which are titanium-iron, has been found to be particularly well adapted for brazing parts together even if one or both of the parts is made of columbium or a columbium alloy; with columbium particles as the high-melting particles 16, a remelt temperature as high as 3500° F. has been obtained when the proper brazing cycle is followed.

With reference to the series of illustrations shown in FIGURE 2 and with further reference to FIGURE 3, the method of joining parts together, using the previously described mixture 14, will now be related. The first step comprises disposing thoroughly cleaned part surfaces 12B, 13B adjacent each other, as represented in FIGURE 2A. A fixture or jig (not shown) may conveniently be employed at this time if necessary to hold the parts 10B, 11B in the desired position. Such a fixture or jig, if used, will not be needed throughout all the brazing operation and can be removed at a subsequent time if desired. The second step includes placing the substantially uniform mixture 14 of first and second particles in adjoining relation to the part surfaces 12B, 13B, the mixture being figuratively represented by the particles 15 and the particles 16. The sizes of the illustrated particles 15, 16 would not normally be so large in relation to the gap between the surfaces 12B, 13B as to leave voids like those that appear in the figure; rather, the gap between the parts should be completely filled with the particles where a bond between the parts 10B, 11B is desired. A preferred method of placing the mixture 14 between the parts 10B, 11B is to prepare a slurry of the particles 15, 16 in a carrier vehicle comprising an aqueous solution of methyl cellulose. If the slurry is wet enough, it can be applied with a brush or a sprayer. A slurry having a consistency somewhat analogous to wet mud or paste has been found to produce satisfactory results and to be easily applied with a spatula or the like; such a pasty slurry tends to remain where it is placed and is not prone to flow away from the desired brazing area.

If a slurry is employed to properly place the mixture 14, between the parts 10B, 11B the liquid of the slurry must be removed before brazing is effected. This is conveniently accomplished by drying the assembled parts 10B, 11B in air at 220 to 250° F. for sufficient time to evaporate the water and decompose and drive off the methyl cellulose.

The entire assembly including the parts 10B, 11B, the dried mixture 14, and for purposes of illustration further including a brazing fixture, is then placed in a furnace and heated in a protective atmosphere. Heating in a vacuum is preferred over an inert gas atmosphere for several reasons, one of which is that a vacuum helps ensure that any detrimental moisture possibly remaining in the mixture 14 will be carried off. The assembly is heated to a temperature sufficient to melt and coalesce the first, low-melting particles 15, but not high enough to melt the second, high-melting particles 16; this state is represented in FIGURE 2B. The high-melting particles 16 are suspended at this time within the fused first particles 15, and thus are in intimate contact with, while still uniformly distributed throughout, material of said first particles. For purposes of illustration, it will be assumed that the low-melting particles 15 are titanium-iron and that the high-melting particles 16 are columbium, and the specific temperatures stated hereinafter will be understood to be temperatures appropriate for these materials.

Since a titanium-iron alloy containing 68% titanium and 32% iron (the composition assumed to be in use) reportedly melts at 1985° F., heating the assembly to about 2000° F. theoretically would be sufficient to melt the first particles 15; for complete assurance of melting, however, the temperature has in practice been taken up to about 2200° F. If the temperature of the assembly is held at 2200° F., material of the solid second particles 16 will begin to diffuse in significant amounts, into the fused first particles 15 to form a tertiary alloy of titanium, iron, and columbium. The most significant attribute of this newly formed alloy, as well as of all of the other alloys resulting from diffusion of the specified high-melting particles 16 into the fused low-melting particles 15, is that the new alloy has a higher melting temperature than the low-melting particles. Eventually, sufficient material of the high-melting particles 16 will have diffused into the coalesced low-melting particles 15 throughout the mixture 14 to the extent that the melting point of every part of the mixture 14 is higher than the maintained 2200° F. and, consequently, the entire mixture will solidify. The parts 10B, 11B will thus be rigidly connected by the now solid mixture 14.

An alternate method of effecting the step of solidifying the mixture and thereby rigidly connecting the parts 10B, 11B (as represented in FIGURE 2C) is to lower the temperature of the assembly below the melting temperature of the first particles, e.g., to about 1900° F.; conservative practice dictates that this be done after the mixture has been held at the 2200° F. temperature for a modest soaking period of, for example, 15 or 20 minutes to ensure against incomplete fusion. The fused first particles 15, having wet the surfaces 12B, 13B when they were molten, now hold the surfaces together when they are once again solid; the parts are thus bonded and the basic brazing step is complete.

The two possible ways to solidify the brazing mixture 14 can perhaps best be seen in FIGURE 3, where the numeral 17 indicates the point, i.e., temperature, that the entire mixture solidifies if diffusion is solely relied on to effect solidification and the numeral 18 indicates the point of solidification when the temperature is lowered to reach the solidus line. Inherent diffusion of the material of the high-melting particles 16 into the coalesced low-melting particles 15 promotes solidification of the mixture, of course, since at least a portion if not all of the mixture has had its melting temperature affected. If any part of the mixture has had its melting temperature raised, less heat must be removed from the mixture before it will solidify since, in effect, the melting temperature of the mixture is determined by the melting temperature of its lowest-melting constituent.

The parts 10B, 11B having been rigidly connected, the assembly can now be brought back to room temperature, if desired, and the fixture removed. Using only normal care in handling, the parts 10B, 11B can be checked for alignment, the area of the bond between the parts inspected, etc. The remelt temperature of the joint at this time, however, is probably little better than joints obtained by prior-art methods; for the full potential of the joint has not yet been ensured. Diffusion of material of the second into material of the first particles, as well as the inherent diffusion of material of the first into material of the second particles, is highly temperature-dependent. That is, the rate of solid-state diffusion of one material into another is a function of the ratio of the temperature at which diffusion is taking place to the melting point of the resulting alloy. Accordingly, diffusion between the subject materials at room temperature is almost negligible as compared to the diffusion which would take place near the melting temperature of the low-melting particles, e.g., at about 1900° F. If a substantially constant diffusion rate is to be maintained as diffusion progresses, the temperature of the mixture must be continuously increased. Thus, the temperature of the bonded parts 10B, 11B must be returned at least to the previous brazing levels and preferably to higher levels if complete diffusion is to be facilitated.

Before the brazing process is resumed, however, by proceeding to an elevated-temperature diffusing phase, it is practicable (where opportune) to protect the parts 10B, 11B against possible corrosion, at temperatures higher than those earlier reached, by applying thereto a protective coating. Even somewhat brittle coatings can be employed, if desired, for the joint between the parts 10B, 11B, having been solidified, will remain solid throughout the remainder of the process and thus will experience relatively little dimensional change. An example of such a coating is one deposited by flame-spraying alumina or zirconia, etc.

Since the bonded parts 10B, 11B no longer require a fixture, they, upon being placed in a high vacuum furnace, take up no more room than their own space envelopes demand. If it is desired, they can be stacked, nestled, interlaced, etc., in ways never possible before in brazing, to get more parts into the furnace and thereby to contribute to the improved and economical use of the furnace.

The last step of the bonding process comprises increasing the temperature of the mixture 14 at a rate which contributes to solid-state diffusion of the second particles 16 throughout the mixture without causing the mixture to reach its instantaneous solidus temperature. It will be assumed, then, that the bonded parts are at a temperature of 2200° F. (as shown by the numeral 19 in FIGURE 3), it being immaterial whether the point was arrived at by continuously maintaining the temperature at 2200° F. following the fusing step (as represented by the broken line 20) or whether the point was reached after some interruption in temperature (as represented, for example, by the line 21). The state of the mixture corresponding to the point 19 in FIGURE 3 is represented by FIGURE 2D wherein the particles 16 are reduced in size but would still be identifiable in a photomicrograph.

For convenience, an arbitrary point for reference in the diffusion phase is represented by FIGURE 2E and by the numeral 22 in FIGURE 3. It matters not whether the time-temperature history is represented by lines 23, 24, 25 or by some other line or lines having substantially positive slopes. The line 23 represents probably the easiest manner of reaching point 22, while line 25, which represents a substantially continuous increase of temperature, indicates probably the most intricate manner of reaching the point and would no doubt require somewhat more sophisticated controls for the heat source than would a simple stair-step or straight-line approach. The procedure followed in moving from point 19 to point 22 is repeated in moving to higher temperatures as desired, e.g., to 2750° F., to 3000° F., etc., until eventually all of the high-melting particles 16 have lost their identity and the mixture has become a substantially homogeneous alloy of material of the first and second particles 15, 16 joining the parts 10B, 11B.

It may be seen that the first, low-melting, metallic particles 15 which were melted in wetting contact with the mutually contiguous parts 10B, 11B can properly be described as means for joining the parts. Further, the solid metallic particles 16 which are dispersed throughout and diffusible into the means for joining the parts can properly be described as means for raising the melting temperature of said means for joining the parts. Thus, the first-named means for joining parts and the second-named means for raising the melting temperature of the first means, together comprising a brazing composition, can produce a serviceable joint for parts at elevated temperatures both above and below 2500° F. When the first means comprises particles of an alloy of titanium-iron and the second means comprises particles of at least one of the metals selected from the group consisting of columbium, tantalum, and tungsten, a brazing mixture is provided which is well suited for the brazing of refractory metals and alloys, and in particular is well suited for brazing columbium and its alloys.

It has been found through experimentation, that when the low-melting particles 15 comprise more than 65 mole percent of the mixture, the remelt properties of the fused joint are generally not greatly improved by the diffusing action of the high-melting particles 16. It has been similarly found that when the high-melting particles 16 comprise more than 80 mole percent of the mixture 14, the flowability of the mixture is generally less than satisfactory. The optimum percentages of the constituents of the mixture are determined, in specific applications, by the specific materials employed in the mixture, the material of the parts to be joined, and the expected service temperature of the joined parts.

In view of the foregoing, it will be apparent that a brazing process has been taught herein in which at least part of the process can be as high as 3000° F., which is substantially above conventional brazing temperatures. Since the joint which is realized from the brazing process described herein is always solid at the highest temperature reached in the brazing process, the expected service temperature of the brazed parts can be considerably higher than the highest process temperature. An advantage of this quality of the joint is that, in the absence of restraining fixtures, non-destructive testing of the joint for its remelt temperature is, in effect, accomplished during the diffusion phase of the brazing process. That is, if in going to (for example) 3000° F. in the diffusion phase of the process the parts do not separate or slide relative to one another, the bond between the parts has remained solid and may be said to have been tested and found, at 3000° F., to be below the remelt temperature. The solid nature of the brazing material at elevated temperatures, by eliminating the requirement for tack welding, fixtures, or jigs to maintain a proper spatial relationship between parts during the diffusion phase of the brazing process, thus makes non-destructive testing an economical reality for all the brazed joints resulting from a given brazing operation.

The mixture of metallic particles described herein for use as a brazing mixture readily finds application as an intermediate material for fabricating other connecting means. For example, if a suitable mixture of low- and high-melting particles is raised to the melting temperature of the low-melting particles, and then the fluid mixture is cast into the shape of a mechanical fastener such as a rivet 26 (FIGURE 4), a fastener is realized which has the same remelt temperature properties as the joints previously described (before diffusion is effected). Upon employing the diffusion process, the fasteners are improved in remelt properties as are the previously described brazed joints. While the low-melting material, e.g., titanium-iron, in an exemplary rivet will normally be relatively soft and amenable to upsetting, the high-melting particles, for example, tungsten, are usually characterized as being brittle at temperatures below about 700° F. The high-melting particles may thus be susceptible to fracture during upsetting at temperatures below 700° F. if a reasonable amount of care is not employed. The fracture of a high-melting particle internally of the rivet is of relatively little consequence, but fracture of such a particle at the surface of the rivet might create a more stress-susceptible region and thus should be avoided where possible. The advantage of achieving fasteners having a very high service temperature would appear to outweigh any extra care deemed advisable in upsetting rivets, threading bar stock, etc. By diffusing the high-melting particles into the fused low-melting particles (FIGS. 4B through 4F) after the fasteners have been brought to their final configurations, i.e., after the rivets have been upset, a high remelt temperature is achieved while still using more or less conventional forming and installation techniques. The successive showings of the high melting particles as diffusion progresses in the rivet are analogous to the views of the joint in FIGS. 2C through 2G, and thus need no further description. Other fastening elements which can be formed with essentially conventional forming techniques (such as machining, casting, and brake forming) are bolts and other threaded members, clips, nails, dowels, and pins, etc.

To recapitulate, the present method of joining parts begins with distributing a metallic material of given melting temperature (viz, the high-melting material) substantially uniformly throughout another metallic material (i.e., the low-melting material) having a melting temperature lower than the given melting temperature. Next, the low-melting material is fused to provide intimate contact between the two metallic materials. The parts to be joined are then rigidly connected with the fused material as follows. In the brazing operation, fusing of the low-melting material takes place when that material is in contact with the parts 10B, 11B to be joined; solidifying the low-melting material thus rigidly connects the parts. With mechanical fasteners, the step of rigidly connecting the parts 10C, 11C is a function of the type of fastener employed. Thus, with threaded members such as bolts, nuts are threaded onto the members and tightened; with rivets, upsetting accomplishes the step of rigidly connecting the parts 10C, 11C. The last step comprises raising the melting temperature of the fused material by effecting the solid-state diffusion of the high-melting material into the low-melting material.

While several embodiments of the invention, together with modifications thereof, have been described in detail herein and shown in the accompanying drawing, it will be evident that various further modifications are possible in the details of its steps and in the arrangement and construction of its components without departing from the scope of the invention.

What is claimed is:

1. The method of joining parts comprising:
   distributing substantially uniformly throughout particles of a first metallic material particles of a second metallic material of given melting temperature, the first metallic material having a melting temperature lower than the given melting temperature, and the first metallic material comprising between approximately 20 to 65 mole percent of the mixture;
   fusing the particles of the first metallic material in a protective atmosphere;
   rigidly connecting the parts with the fused material; and
   subsequently raising the melting temperature of the fused material by effecting solid-state diffusion thereinto of the second material so as to produce an alloy of the two metallic materials.

2. The method of joining parts claimed in claim 1 wherein the step of fusing the particles of the first metallic material further comprises fusing said first metallic material in contact with the parts to be joined and said first metallic material being one that when molten wets the parts to be joined.

3. A method of brazing parts together comprising the steps of:
   disposing the clean part surfaces to be joined adjacent each other;
   placing adjacent the part surfaces to be joined a mixture comprising first particles of lower melting temperature than the parts, the first particles being particles of a titanium-iron alloy and the mixture further comprising second particles selected from the group consisting of columbium, tantalum, and tungsten, said first particles constituting from approximately 20 to 65 mole percent of the mixture;

heating the first particles in a protective atmosphere to a temperature sufficient to melt and coalesce them so as to wet the parts being joined;

diffusing at least some of the material of the second particles into at least some of the coalesced first particles to thereby produce an alloy of material of the second particles with material of the coalesced first particles having a melting point higher than that of the first particles, whereby solidification of mixture is promoted;

solidifying the mixture; and increasing the temperature of the mixture at a rate which contributes to solid state diffusion of the second particles throughout the mixture without causing the mixture to reach its instantaneous solidus temperature.

4. The method claimed in claim 3 wherein the parts are columbium or a columbium alloy and wherein the step of solidifying the mixture comprises maintaining the mixture at a temperature approximately equal to the melting temperature of the first particles for a period of time sufficient for the second particles to diffuse into the first particles throughout the mixture to the extent that the alloy formed thereby has a melting point higher than the temperature maintained.

5. A method of brazing parts together comprising the steps of:

disposing the part surfaces to be joined adjacent each other; placing adjacent the part surfaces to be joined a mixture comprising first particles of lower melting temperature than the parts, the first particles being selected from the group consisting of silver, gold, and copper, and the mixture further comprising second particles consisting of particles of palladium;

heating the first particles to a temperature sufficient to melt and coalesce them;

diffusing at least some of the material of the second particles into at least some of the coalesced first particles to thereby produce an alloy of material of the second particles with material of the coalesced first particles which has a melting point higher than that of the first particles, whereby solidification of the mixture is promoted;

solidifying the mixture; and increasing the temperature of the mixture at a rate which contributes to solid state diffusion of the second particles throughout the mixture without causing the mixture to reach its instantaneous solidus temperature.

6. The method claimed in claim 5 wherein the step of placing the mixture adjacent the parts to be joined includes interposing adjacent the part surfaces to be joined a mixture comprising first particles of lower melting temperature than the parts and constituting approximately 20 to 65 mole percent of the mixture.

7. The method claimed in claim 5 wherein the step of solidifying the mixture comprises lowering the temperature of the mixture below the melting temperature of the first particles.

8. The method claimed in claim 5 wherein the step of solidifying the mixture comprises maintaining the mixture at a temperature approximately equal to the melting temperature of the first particles for a period of time sufficient for the second particles to diffuse into the first particles throughout the mixture to the extent that the alloy formed thereby has a melting point higher than the temperature maintained.

9. The method claimed in claim 5 wherein the step of increasing the temperature of the mixture further comprises substantially continuously increasing the temperature.

10. A method of brazing parts together comprising the steps of:

disposing the part surfaces to be joined adjacent each other;

placing adjacent the part surfaces to be joined a mixture comprising first particles of lower melting temperature than the parts and selected from the group consisting of gold and copper, and the mixture further comprising second particles selected from the group consisting of palladium, platinum, and nickel;

heating the first particles to a temperature sufficient to melt and coalesce them;

diffusing at least some of the material of the second particles into at least some of the coalesced first particles to thereby produce an alloy of material of the second particles with material of the coalesced first particles having a melting point higher than that of the first particles, whereby solidification of the mixture is promoted;

solidifying the mixture; and increasing the temperature of the mixture at a rate which contributes to solid state diffusion of the second particles throughout the mixture without causing the mixture to reach its instantaneous solidus temperature.

11. The method claimed in claim 10 wherein the second step includes interposing adjacent the part surfaces to be joined a mixture comprising first particles of lower melting temperature than the parts and constituting approximately 20 to 65 mole percent of the mixture.

12. The method claimed in claim 10 wherein the step of solidifying the mixture comprises lowering the temperature of the mixture below the melting temperature of the first particles.

13. The method claimed in claim 10 wherein the step of solidifying the brazing mixture comprises maintaining the brazing mixture at a temperature approximately equal to the melting temperature of the first particles for a period of time sufficient for the second particles to diffuse into the first particles throughout the mixture to the extent that the alloy formed thereby has a melting point higher than the temperature maintained.

14. The method claimed in claim 10 wherein the last-named step of increasing the temperature of the mixture further comprises substantially constantly increasing the temperature.

References Cited

UNITED STATES PATENTS

| | | | |
|---|---|---|---|
| 2,373,117 | 4/1945 | Hobrock | 29—498 |
| 3,024,109 | 3/1962 | Hoppin | 29—487 X |
| 3,046,651 | 7/1962 | Olmon | 29—504 X |
| 3,073,269 | 1/1963 | Hoppin | 29—504 X |
| 3,141,238 | 7/1964 | Harman | 29—498 |
| 3,163,500 | 12/1964 | Konrad | 29—504 X |
| 3,217,404 | 11/1965 | Rhys | 29—498 |
| 3,259,971 | 7/1966 | Gagola | 29—498 |
| 3,276,113 | 10/1966 | Metcalfe | 29—487 |
| 3,317,288 | 5/1967 | Marshall | 29—498 X |

OTHER REFERENCES

Constitution of Binary Alloys, Hansen, second edition, Metallurgy and Metallurgical Engineering series, 1958, p. 1198 Si-Ti Phase Diagram.

JOHN F. CAMPBELL, Primary Examiner

R. B. LAZARUS, Assistant Examiner

U.S. Cl. X.R.

29—497, 489, 500, 503, 504